US009650810B2

(12) United States Patent
Grziwok et al.

(10) Patent No.: US 9,650,810 B2
(45) **Date of Patent: *May 16, 2017**

(54) DOCKING APPARATUS

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

(*) Notice: Subject to any disclaimer, the term of this patent is extended or adjusted under 35 U.S.C. 154(b) by 208 days.

This patent is subject to a terminal disclaimer.

(21) Appl. No.: 14/209,601

(22) Filed: Mar. 13, 2014

(65) Prior Publication Data

US 2014/0260443 A1 Sep. 18, 2014

Related U.S. Application Data

(60) Provisional application No. 61/791,786, filed on Mar. 15, 2013.

(51) Int. Cl.
*F16M 13/00* (2006.01)
*E05B 65/00* (2006.01)
(Continued)

(52) U.S. Cl.
CPC .............. *E05B 65/00* (2013.01); *A47F 7/024* (2013.01); *E05B 73/0082* (2013.01); *Y10T 70/50* (2015.04); *Y10T 70/5027* (2015.04)

(58) Field of Classification Search
CPC ............... E05B 365/00; E05B 73/0082; Y10T 70/5027; Y10T 70/50; A47F 7/024
(Continued)

(56) References Cited

U.S. PATENT DOCUMENTS 4,328,687 A * 5/1982 Ritchie .................. E05B 73/00 42/70.07
6,379,073 B1 4/2002 Yoo
(Continued)

FOREIGN PATENT DOCUMENTS

CA 2776372 A1 7/2012
DE 202009013722 U1 1/2011
EP 1686447 A3 9/2009

OTHER PUBLICATIONS http://armodilo.com/products/armotwist, Armodilo ArmoTwist, 2013, downloaded Sep. 25, 2013, 3 pages.
(Continued)

*Primary Examiner* — Gwendolyn Baxter
(74) *Attorney, Agent, or Firm* — Fish & Richardson P.C.

(57) ABSTRACT

Some examples of a docking apparatus can be implemented to include a key-lockable mechanical mount. The mount includes a housing, a locking unit, a pinion and a lock plate. The locking unit is disposed on the housing and includes a lock mandrel. The locking unit is configured to be rotated to either an open position or a closed position with a key. The A pinion is mounted to the lock mandrel. The pinion is configured to rotate in response to a rotation of the locking unit using the key. The lock plate is configured to be received in the housing. The lock plate is configured either to rotate in response to the rotation of the pinion or to be driven by springs. The lock plate is configured to capture a mounting plate configured to attach to electronic equipment.

28 Claims, 7 Drawing Sheets

(51) Int. Cl.
*A47F 7/024* (2006.01)
*E05B 73/00* (2006.01)

(58) Field of Classification Search
USPC .......... 248/551, 553; 70/58, 62, 333, 14, 18; 361/679.4, 679.55, 679.58
See application file for complete search history.

(56) References Cited

U.S. PATENT DOCUMENTS

| | | | | |
|---|---|---|---|---|
| 6,755,056 | B2 * | 6/2004 | Igelmund | E05B 73/0005 248/499 |
| 6,763,688 | B1 * | 7/2004 | Syu | E05B 73/0082 248/553 |
| 7,218,510 | B2 | 5/2007 | Hillman | |
| 7,316,377 | B2 | 1/2008 | Smed | |
| 7,694,922 | B2 | 4/2010 | Kim | |
| 8,701,452 | B2 * | 4/2014 | Foster | E05B 73/0082 248/316.1 |
| 2006/0232926 | A1 | 10/2006 | Homer | |
| 2011/0108698 | A1 | 5/2011 | Chen | |
| 2011/0185605 | A1 * | 8/2011 | Parenti | E05B 65/00 40/202 |
| 2012/0061542 | A1 | 3/2012 | Bostater | |
| 2012/0234055 | A1 | 9/2012 | Bland | |
| 2012/0273630 | A1 | 11/2012 | Gillespie-Brown | |

OTHER PUBLICATIONS http://www.ipadenclosures.com/ipad__kiosk__enclosure/ipad__table__mounts__stands/axis-ipad-table-mount, iPad Enclosures LLC, Axis iPad Mount, 2013, downloaded Sep. 25, 2013, 4 pages.

Notification of Transmittal of the International Search Report and the Written Opinion of the International Searching Authority, International Application No. PCT/US2014/026373, mailed Aug. 28, 2014, 12 pages.

* cited by examiner

DOCKING APPARATUS

CROSS REFERENCE TO RELATED APPLICATIONS

This disclosure claims the benefit of the priority of U.S. Provisional Application Ser. No. 61/791,786, filed Mar. 15, 2013, and entitled "Docking Apparatus", which is incorporated herein by reference in its entirety.

TECHNICAL FIELD

This disclosure relates to a docking mechanism and apparatus, for example, for supporting tablet computers and other types of electronic equipment.

BACKGROUND

To deter theft or vandalism, publicly displayed tablet computers or other electronic devices sometimes are encapsulated in a secure enclosure. The secure enclosure can be attached to a pedestal, a post or the like, and affixed to an immovable surface. To attach the secure enclosure to the pedestal or post, a docking mechanism may be used. Mains power can be required for publicly displayed electronic devices (sometimes called "kiosks") because onboard battery life can be insufficient for continuous use. Data connection with the tablet to outside devices can be desirable, to operate peripheral equipment, such as card readers, receipt printers, keyboards, and the like.

SUMMARY

This disclosure relates to a docking mechanism and apparatus, for example, for a docking mount to support tablet computers and electronic equipment. The docking apparatus described herein combines a key-driven (or spring-loaded) rotating lock plate as part of a mechanical display mount with an electronic connection. Alternatively, the lock plate can be released by a button or lever, which movement to effect release can be enabled or disabled with a key. Alternatively, or in combination, the lock plate can be spring-loaded and its engagement triggered by a pressure plate, which the lock plate and pressure plate can be reset with a key. Alternatively, or in combination, the lock plate can be spring-loaded and its engagement triggered by a pressure plate, which the lock plate and pressure plate can be reset with a button or lever.

Certain aspects of the subject matter described here can be implemented as a key-lockable mechanical mount. The mount includes a housing, a locking unit, a pinion and a lock plate. The locking unit is disposed on the housing and includes a lock mandrel. The locking unit is configured to be rotated to either an open position or a closed position with a key. The A pinion is mounted to the lock mandrel. The pinion is configured to rotate in response to a rotation of the locking unit using the key. The lock plate is configured to be received in the housing. The lock plate is configured either to rotate in response to the rotation of the pinion or to be driven by springs. The lock plate is configured to capture a mounting plate configured to attach to electronic equipment.

This, and other aspects, can include one or more of the following features. The lock plate can include multiple gear teeth. The pinion can include a bevel gear that includes multiple bevel gear teeth configured to mesh with the multiple gear teeth in response to the rotation of the pinion. The lock plate can be spring-loaded. The mount can further include at least one lock spring, at least one spring hook to attach the lock plate to at least one lock spring, a pressure plate to hold the lock plate open until depressed by a mounting plate, and a release plate to open the lock plate and reset the pressure plate. The release plate can be manually actuated. The mount can further include a release lever that actuates the release plate, and a lockout pawl mounted to the locking unit. The lockout pawl can be configured to allow or prevent operation of the release lever. The release plate can be driven by the pinion, which can be actuated by the locking unit. The pinion can incorporate a bevel gear and the release plate can include a series of gear teeth which mesh with the teeth of the bevel gear on the pinion. The mount can further include a mounting plate configured to be mounted to a rear-facing surface of an enclosure configured to receive electronic equipment. The mounting plate can be configured to capture the enclosure between the mounting plate and a stiffener plate configured to be mounted to the enclosure. The electronic equipment can be a tablet computer. The housing can further include lead-in geometry configured to orient and guide the mounting plate into the housing. The housing can further include a locating protrusion configured to engage with a locating pocket or notch included in the mounting plate. The housing can further include a magnet configured to attract the mounting plate to the housing. The housing can further include electrical contacts to transfer electrical signals through the mounting plate to the electronic equipment. The electrical contacts can include multiple pogo pins configured to mate with contact pads attached to the electronic equipment. The housing can include an internal dock plate configured to be disposed in the housing. The housing and the internal dock plate can include passages configured to receive a cable to transmit signals to electronic equipment. The housing can include a magnet housing configured to receive a circuit board connected to an end of the cable. The housing can include a front surface and a back surface separated from the front surface.

Certain aspects of the subject matter described here can be implemented as a key-lockable mechanical mount that includes a housing, a key lock, a lockout pawl, a release button, a dock plate, a magnet housing, and a pressure plate. The key lock is disposed in the housing. The key lock includes a lock mandrel disposed in the housing. The key lock is configured to be either in an open position or a closed position. The lockout pawl is mounted to the lock mandrel. The release button is attached to the housing. The lockout pawl is configured to allow or prevent operation of the release button in response to the key lock being in the open position or the closed position. The dock plate is positioned in the housing. The magnet housing is positioned over the internal dock plate and attached to the housing. The pressure plate is positioned over the magnetic housing. The pressure plate is positioned in the housing.

This, and other aspects, can include one or more of the following features. The mount can include an anti-rotation plate mounted to the key lock. The dock plate can include a pin. The mount can further include a button return spring positioned beneath and connected to the pin. The release button can include a hook to which the button spring is connected. The pressure plate can include multiple rib areas. The mount can include multiple compression springs positioned in respective slotted sleeves in the mounting unit. The multiple ribbed areas can press onto the multiple compression springs. A release plate and a lock plate can be attached to the housing with spring hooks on the lock plate passing through slots in the release plate. The release plate can include a release tab configured to attach to a slot on the release button. The lock plate can include multiple lock springs attached between respective multiple spring hooks and opposing spring hooks on the dock plate.

Certain aspects of the subject matter described here can be implemented as a system for mounting a tablet computer. The system includes a support structure having a first end and a second end. A housing is configured to be attached to the first end of the support structure. A lock plate is configured to be received in the housing. The lock plate is configured to rotate either driven by springs or in response to the rotation of the lock pinion. A rear housing is configured to be attached to the lock plate through a mounting plate configured to be captured by the lock plate. The rear housing is configured to receive or be comprised by an electronic device, for example a tablet computer.

This, and other aspects, can include one or more of the following features. The mounting post, the housing, and the rear housing can be configured to receive a cable configured to be connected to the electronic device to transmit power signals or data signals to the electronic device. An electrical interface can be disposed between the housing and the rear housing. The electrical interface can be configured to transmit the power signals or the data signals received through the cable to the electronic device. A key can be configured to rotate the lock pinion, which in turn rotates the lock plate to securedly affix the rear housing to or release the rear housing from the housing. A pressure plate, when depressed, can release a spring-driven lock plate which captures the rear housing to the housing. A release latch can be configured to rotate the release plate to open the lock plate, release the rear housing from the housing, and reset the pressure plate. A locking unit can be installed in the housing. The locking unit can include a lock pinion configured to be rotated. The lock pinion can be configured to drive a bevel gear on the second axis in response to a rotation of the lock pinion.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
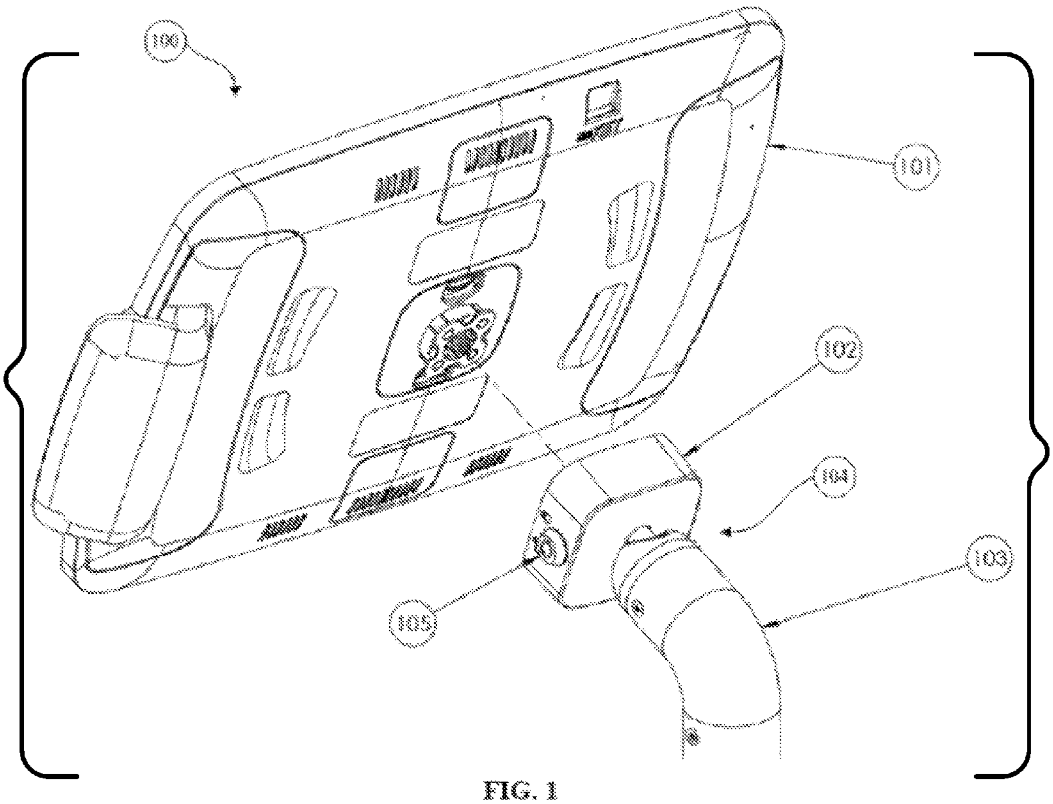
FIG. 1 illustrates an example docking apparatus.

This disclosure relates to a docking mechanism and apparatus, and specifically to a docking mount suited for use in supporting electronic equipment, for example, a tablet computer or other device. The docking apparatus described herein includes a docking mount and a mounting post for mounting the electronic equipment. In some implementations, the docking mount includes a rotating lock plate, a locking unit with a lock mandrel, and a housing to house the lock plate and the locking unit. The rotating lock plate is driven by a pinion mounted directly to a shaft of the locking unit. The locking unit can include, for example, a standard tubular lock. In some implementations, the lock plate has gear teeth that mesh with gear teeth of a bevel gear on the pinion. Turning the correct key in the locking unit thereby acts to directly rotate the lock plate. As it rotates, the lock plate captures the corners of a mounting plate located on the back of the electronic equipment being docked, thus securing the equipment to the docking mount. The planar nature of the docking mechanism allows the docking mount to be compact, while cleanly enclosing all moving parts.

In some implementations, the lock plate may be spring-loaded with a lock spring and spring hook into a locked position, and released into an unlocked position by actuation of a release lever, for example, a button or lever. In some implementations, a lockout pawl is attached to the locking unit which acts to secure the release lever, preventing the lock plate from being moved and thus locking the mechanism from being opened. The lockout pawl is configured to allow or prevent operation of the release lever. In some implementations, the docking mount includes a spring-loaded pressure plate that translates through the lock plate. The pressure plate pops into place when the release lever is actuated, acting to hold the lock plate in an open position to receive the mounting plate. When electronic equipment is docked, the pressure plate depresses into the housing, releasing the lock plate to rotate, for example, in a counterclockwise direction driven by the lock spring. The rotation of the lock plate allows the lock plate to capture the mounting plate fixed to the docked electronic equipment. When a user actuates the release lever, the release lever engages with the lock plate, overcoming the lock spring and rotating the lock plate, for example, in a clockwise direction, to release the mounting plate fixed to the docked electronic equipment.

In alternative implementations, the lock plate is spring-loaded with the lock spring and spring hook into the locked position, and a release plate is coupled to the key lock of the locking unit with the pinion. In certain implementations, the key lock is used to release the mounting plate on the electronic equipment and/or reset the docking mount. When the key lock is used to release the mounting plate and/or reset the docking mechanism, the spring-loaded pressure plate translates through the locking plate and pops into place to hold the lock plate in the open position to receive the mounting plate. When electronic equipment is docked, the pressure plate depresses into the housing, releasing the lock plate to rotate, for example, in a counterclockwise direction driven by the lock spring. The rotation of the lock plate allows the lock plate to capture the mounting plate fixed to the docked electronic equipment. When a user subsequently operates the lock with the key, the pinion drives the release plate to overcome the lock spring and rotate the lock plate, for example in a clockwise direction. When the lock plate resets fully, the mounting plate of the electronic equipment is released, and the pressure plate pops up to hold the lock plate in the open position to again receive the mounting plate.

In some implementations, the user can return the key lock of the locking unit to the “locked” position so that the release plate allows the lock plate to move as the lock plate would if the key lock were left in the “open” position. In such a scenario, the dock mount could be said to be “locked open”.

In some implementations, electronic equipment, for example, tablet computers, do not have adequate battery life to stay powered for a full day of use. A powered docking interface would allow mains power supply to electronic equipment. Furthermore, it can be beneficial to pass data, such as through a Universal Serial Bus (“USB”) connection, to the electronic equipment to facilitate the operation of peripheral equipment that may be connected to the electronic equipment. The subject docking apparatus facilitates transmission of both power and data from the docking mount to the electronic equipment. This transmission of power and data is unaffected by the relative orientation of the docking mount and the docked electronic equipment. The docked equipment may be mounted to the docking mount in any of four primary orientations (portrait, landscape, inverted portrait, and inverted landscape), and the docking mount itself mounted at any angle or orientation, without negative impact to the function of the electrical connections.

The docking apparatus produces a mounting interface that includes a tight mechanical connection between the docked equipment and the docking mount. This tight mechanical connection is facilitated by an arrangement of progressively tighter lead-ins and alignment details. The mounting interface that results is beneficial both for ensuring good electrical contact and allowing mechanical forces to be transmitted through the mounting interface through manipulation without looseness or wobbling. The arrangement of lead-ins and alignment details, in combination with the locking plate, are suited to transmit mechanical forces created by manipulation of the docked equipment across the mounting interface. In some implementations, manipulation of the docked equipment includes pivoting and rotating the equipment.

Figure 3:
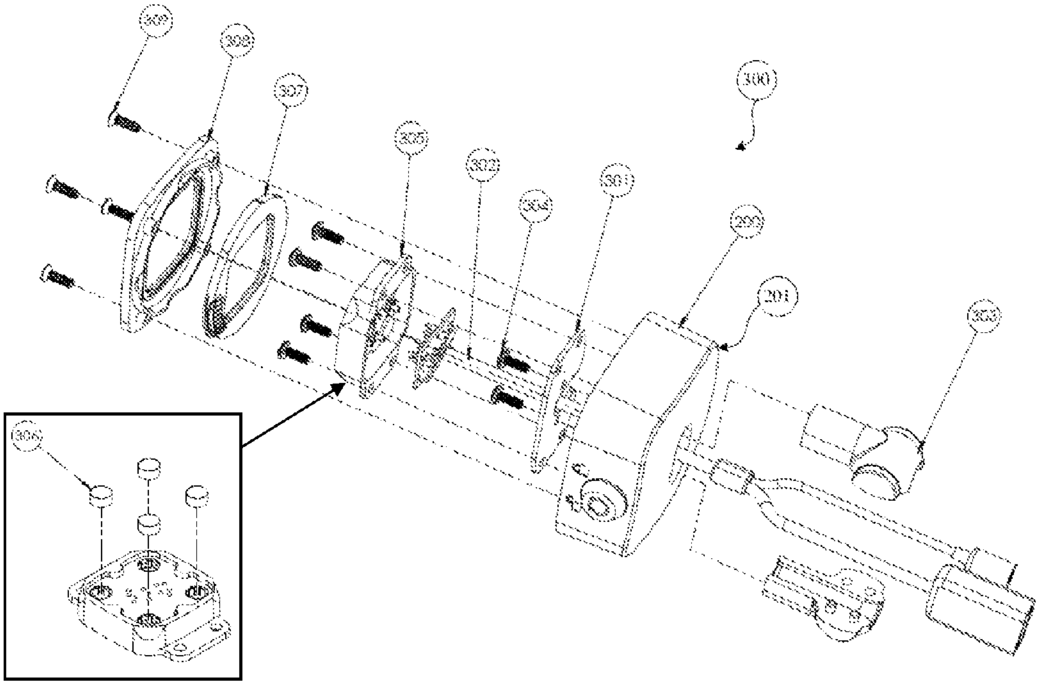
FIG. 3 illustrates an example assembly of the dock mount housing in exploded view.

In some implementations, the docking assembly includes magnets 306 at the mounting interface fixed to the housing, for example, as depicted in FIG. 3. The magnets attract the mounting plate fixed to the electronic equipment into tight alignment with the docking mount and support at least a portion of the weight of the equipment. In some implementations, the user can leave the tablet on the mount without concern that the mounting plate will disengage with the docking mount, which allows the user to use both hands (if needed) to operate the lock. In some implementations, electrical connections between the docking mount and the electronic equipment function as the magnets retain the equipment in the docking mount, regardless of whether the mount is locked or not.

In some implementations, the mounting plate, pinion, locking unit, and lock plate are of material metal, and the housing is of plastic, facilitating an optimal balance of mechanical strength and economic manufacture. In other implementations, the mounting plate, pinion, locking unit, lock plate, housing, and other elements of the docking mount are of a different material or materials. In certain implementations, the elements of the docking apparatus are made with associated manufacturing methods, including die casting, injection molding, and stamping from aluminum, zinc, steel, plastics, composite materials, and glass/fiber reinforced plastics.

Certain implementations of the docking apparatus can provide one or more of the following potential advantages. The docking apparatus can allow the docked electronic equipment to be secured to and removed from the docking mount by use of a standard tubular key. In its various embodiments, this docking apparatus yields a load-bearing, secure, detachable mount with the ability to provide power and data connection to the electronic device. In all embodiments disclosed, the docking apparatus includes an arrangement of lead-ins, guide features, electrical connections, and bevel- or spring-driven locking plate, and uses a standard key lock to control access.

The electrical connections are capable of providing power and data connection (for example USB) in any of four primary orientations (portrait, landscape, inverted portrait, and inverted landscape).

The combination of generally square geometry of the mounting interface and patterned contact pads in the electrical connection is especially suited to the mounting of electronic equipment, for example, tablet computers, because it allows the electronic equipment to be docked in one of four orientations, e.g., at 90-degree increments. For example, because tablet computers generally feature a self-orienting display, this flexibility in docking orientation allows the positioning of the tablet’s camera and other features of the enclosure in any desired orientation without compromising the user interface.

The docking apparatus can allow power and signals (data) to be passed through the mounting interface. The docking apparatus can allow the docked electronic equipment to be mounted in any orientation, for example, portrait, landscape, standard, inverted, and/or other. The mounting interface can facilitate manipulation of the electronic equipment without looseness or wobbling, and provide physical security to the electronic equipment. The docking apparatus can use a magnetic attachment scheme with the magnets to conveniently support the electronic equipment whether the docking mount is locked or not. The docking apparatus can feature a static (non-moving) electrical interface, which is more reliable and durable than a wiping interface. The docking apparatus can be designed to be cost-effectively mass produced.

FIG. 1 illustrates an example docking apparatus 100. The example docking apparatus 100 allows a rear assembly 101 holding the docked electronic equipment to removably mount to a mounting post 103 via the docking mount 102. In some implementations, the docking mount 102 is fixedly secured to a surface, for example a floor or wall, or is supported by a base, for example, a weighted base. In some implementations, the docking mount 102 includes a pole extending from a side of the docking mount for ergonomic positioning. In other implementations, the docking mount 102 does not include the pole. In some implementations, the docking mount 102 is disposed at the end of the mounting post 103. The mounting post 103 supports the docking mount 102 at a specific height, securing the docking apparatus 100 from theft, and delivering power and/or data via an electrical connection, or cable, to an electrical interface in the docking mount 102. The rear assembly 101 includes an enclosure that receives and holds the docked electronic equipment. In some implementations, the docked electronic equipment can include a plate bonded to a surface of the docked electronic equipment. In some implementations, a mounting plate can be incorporated directly into the housing of the docked electronic equipment. The rear assembly 101 includes one or more features that mate with the docking mount 102. The mounting post 103 may consist of a tubular post with a circular cross-section as shown. In other implementations, the mounting post 103 is of a different suitable structure, with a different cross-section, or both. In some implementations, the docking mount 102 fixedly mounts to the mounting post 103, or pivotally mounts with an interposed pivot joint 104. The rear assembly 101 may be locked to the docking mount 102 by the locking unit 105, for example, with a key lock.

Figure 2:
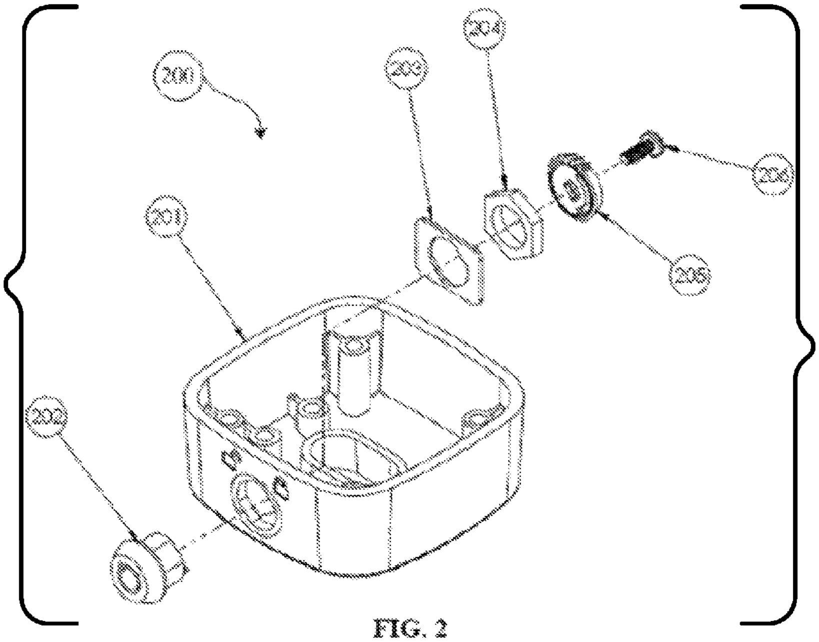
FIG. 2 illustrates an example docking mount in exploded view.

FIG. 2 illustrates an exploded view of an example docking mount 200. The docking mount housing assembly 200 includes a housing 201 and a locking unit 202 disposed on a side surface of the housing 201. The housing has a front surface, a back surface separated from the front surface along a first axis, and a side surface that connects the front surface and the back surface. In some implementations, the front surface is parallel to the back surface, and the side surface is perpendicular to the front surface. The locking unit 202 includes a lock mandrel and a key lock disposed in a hole in the housing 201. In some implementations, an anti-rotation plate 203 is disposed over the locking unit 202 and secured with a lock mounting nut 204. A screw 206 secures the lock pinion 205 to the lock mandrel. The pinion 205 rotates in response to a rotation of the locking unit 202 using a corresponding key.

FIG. 3 illustrates an exploded view of an example docking mount 300. The docking mount 300 includes the example docking mount housing assembly 200 of FIG. 2. The docking mount 300 is assembled by routing a cable 302 through the housing 201 and an internal dock plate 301. The internal dock plate 301 is disposed between a front surface and a back surface of the housing 201, and the internal dock plate includes passages to receive the cable 302. The cable 302 can transmit power and/or signals to electronic equipment. The internal dock plate 301 attaches with screws 304 to ball halves 303. The ball halves 303 can be part of a pivot assembly. A circuit board 310 at the end of cable 302 mounts into a magnet housing 305 with, for example, heat stakes. The magnet housing 305 receives the circuit board 310 at the end of the cable 302. The magnet housing 305 has four magnets 306. In some implementations, the number of magnets 306 can be different. The magnet housing 305 with magnets 306 secures into the housing 201 with, for example, four additional screws as depicted in FIG. 3. The four additional screws clamp and secure the internal dock plate 301 in the process. A lock plate 307 is received in the housing 201 and mates with a pinion 205 of the locking unit 202 of the example docking mount housing assembly 200. The lock plate 307 has a plurality of gear teeth that mesh with bevel gear teeth on the pinion. The front surface of the housing 201, for example, a mount cover 308, is placed over the lock plate 307 and secured, for example, with four screws 309. Components of the docking mount 300 may be assembled in an order different from that described above. In some implementations, different fasteners may be used.

Figure 4:
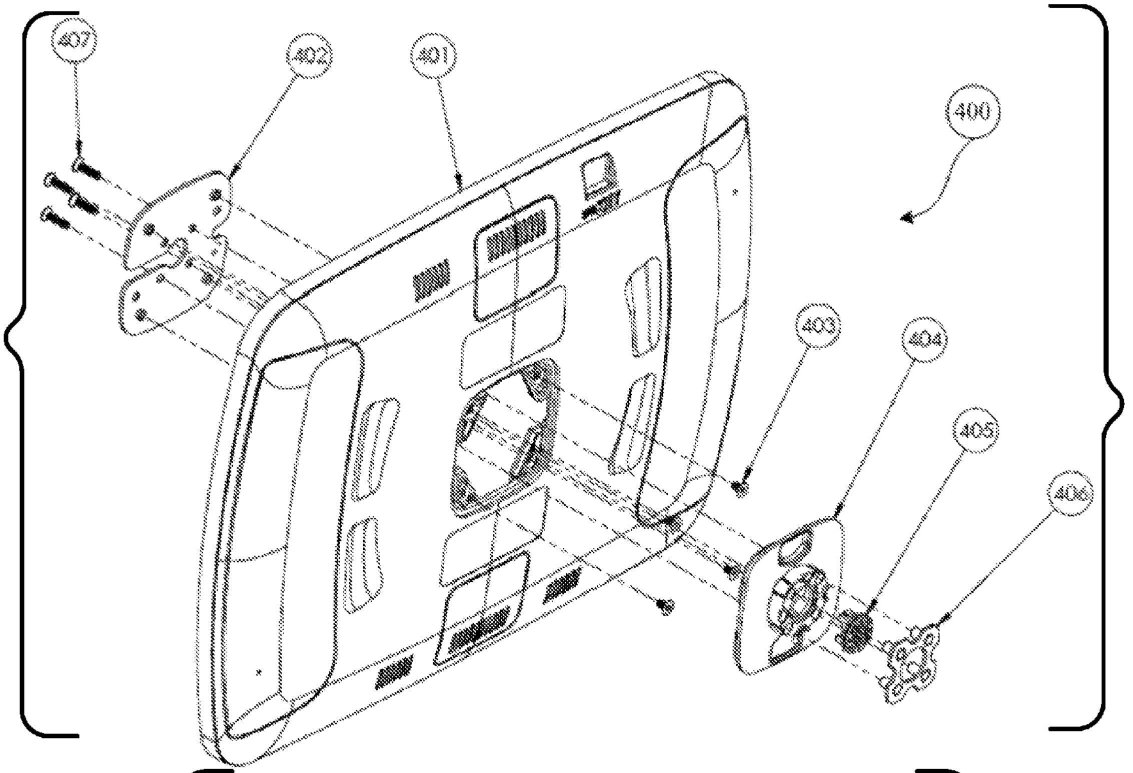
FIG. 4 illustrates an example rear assembly in exploded view.

FIG. 4 illustrates an example rear assembly 400 of the docking apparatus that interfaces with the docking mount. The rear assembly 400 has a rear housing 401 configured to receive electronic equipment, a stiffener plate 402 configured to be mounted to a front-facing surface of the rear housing 401, and a mounting plate 406 configured to be mounted to a rear-facing surface of the enclosure to capture the enclosure between the mounting plate 406 and the stiffener plate 402. To assemble the rear assembly 400, the stiffener plate 402 is secured to the rear housing 401, for example, with four screws 403. In some instances, the rear assembly 400 includes a bullseye board 405, for example, a custom printed circuit board (PCB) with contact pads that mate with pins that can protrude from the docking mount. The bullseye board 405 is captured between a mounting panel 404 and the mounting plate 406. These bullseye board 405, mounting panel 404, and mounting plate 406 are secured to the stiffener plate 402, for example, by four screws 407. In some instances, the mounting plate 406 mounts directly to the stiffener plate 402 without the mounting panel 404 and bullseye board 405. This arrangement of mounting features, including the use of a metal stiffener plate 402 internal to the rear housing 401, provides a secure and robust mechanical connection between the mounting plate 406 and the balance of the docked object. When the mounting plate 406 is retained in the dock mount 102, the rigidity of this interface is transmitted further to the dock mount 102. The rigidity of the rear housing 401 helps prevent the rear assembly 101 from flexing relative to the docking mount 102, which could be detrimental to the user experience.

Figure 5:
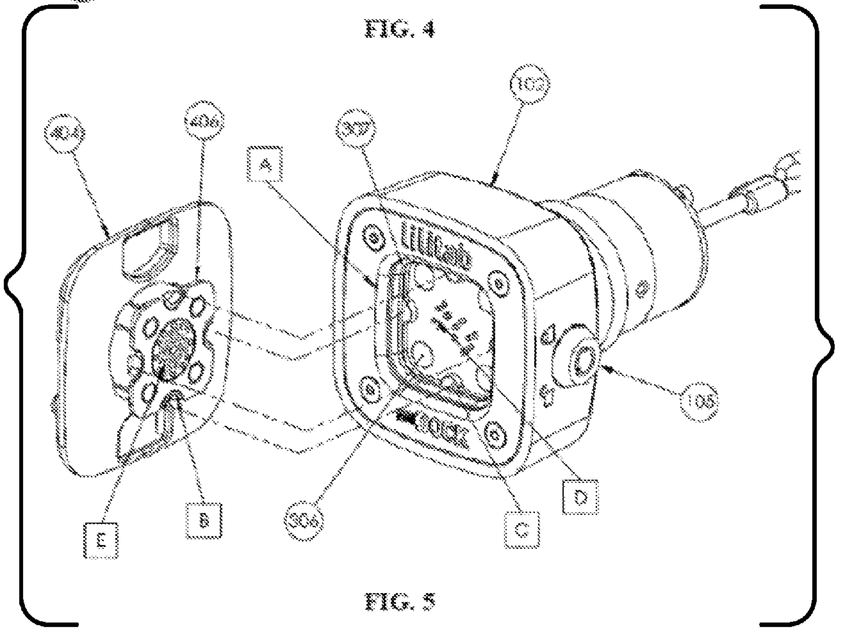
FIG. 5 illustrates an example docking interface.

FIG. 5 illustrates an example docking interface between an example docking mount 102 and an example mounting plate 406. To perform a docking operation, the rear assembly 101 is mated to the docking mount 102. The example mounting plate 406 is fixed to the mounting panel 404 and bullseye board 405 of FIG. 4. As the rear assembly 101 approaches the docking mount 102, the mounting plate 406 locates, orients and guides itself into docking lead-in geometry A of the docking mount 102, thus performing coarse alignment. For example, a generally square shape of the mounting plate 406 matches a generally square opening A of the docking mount 102. Additionally, the docking lead-in geometry can include a male protrusion C that mates with a female pocket B of the mounting plate 406. As the mounting plate 406 engages fully with the docking mount 102, at least one locating pocket E on the mounting plate 406 engage with corresponding at least one locating protrusion D on the docking mount 102, thus performing fine alignment. Magnets 306 can act on the mounting plate 406 to attract, for example, pull and hold, the mounting plate 406 to the docking mount 102. This design and arrangement of components, for example, the arrangement of progressively tighter lead-ins and alignment details, produces a tight mechanical connection between the rear assembly 101 and the docking mount 102.

Turning a key in the locking unit 105 rotates the lock pinion 205, which operates the bevel gear G and in turn rotates the lock plate 307 (see also FIG. 5), which captures the corners of the mounting plate 406. In the center area of the dock mount 102, pogo pins from circuit board 508 (FIG. 7) make electrical contact with contact pads F, which lie on the bullseye board 405 within the rear assembly 101. The alignment performed by the locating pockets E and locating protrusions D acts to precisely position the contact pads F and pogo pins relative to each other, allowing power and electrical signals to cross the mated interface. The pattern of contact pads is designed so that the interface may be mounted in any of four orientations and still connect to the same electrical circuits. This allows the rear assembly 101 to be mounted in any of the four primary orientations (e.g. landscape, portrait, inverted landscape, inverted portrait), as may be desired by the user. The pogo pin arrangement includes redundant pins with increased length on some circuits to mitigate the effects of arc damage when making and breaking hot (powered) circuits.

Materials and methods that offer precision and cost effectiveness can be implemented in the manufacture of the disclosed docking apparatus. For example, to have mechanical strength in all areas where load may be transmitted, particularly by someone wishing to damage the enclosure so as to steal the contained hardware, in some implementations, the mounting plate 406, lock plate 307, stiffener plate 402 and internal dock plate 301 are all made with metal to facilitate load transfer. Further, the mounting plate 406 can be ferrous (so that it is attracted to magnets) and so it can made from steel or any other material that exhibits magnetic properties. Sheet metal stampings can be used for flat plates of steel. In some implementations, the mounting plate 406, stiffener plate 402, and internal dock plate 301 can be manufactured from sheet metal. The lock plate 307 includes ramp features and geometry for bevel gear teeth.

In some implementations, the lock plate 307 can be manufactured by die casting. Additionally, non-structural alignment details, specifically locating pockets E on the mounting panel 404 and locating protrusions D on the magnet housing, can effect alignment between the rear assembly 101 and dock mount 102 so that the Pogo Pins reliably and repeatably make proper contact with the Contact Pads F as the docked object and dock mount 102 are brought together. These details can but need not transmit significant load. Such detail features can be created with precision, in some implementations, by plastic injection molding. Specifically, the mounting panel 404 and magnet housing can both be injection molded from plastic, so that the manufacture of the reciprocal lead-in features of the locating pockets E (on the mounting panel 404) and the locating protrusions D (on the magnet housing) can benefit from the repeatability and low cost of the plastic injection molding process. Such detail features can, in other implementations where more strength may be desired, be made with punched and/or insert molded metal parts.

Figure 6:
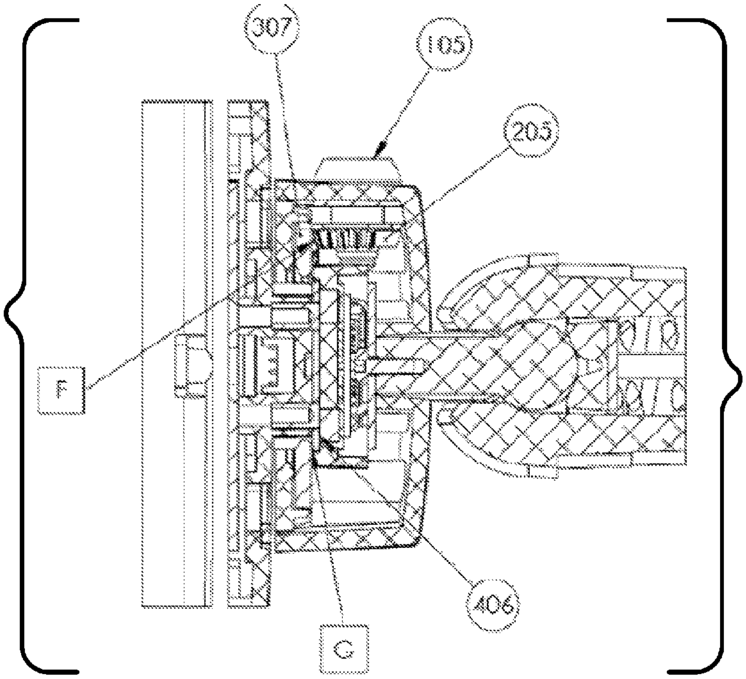
FIG. 6 illustrates a cross-sectional view of an example docking mount.

FIG. 6 illustrates a cross-section view of an example docking apparatus to show the operation of the lock plate 307 The lock plate 307 is actuated (in a rotating motion), for example, by turning a key in the locking unit 105, which in turn rotates the lock pinion 205. The bevel gear G of the lock pinion 205 acts to rotate the lock plate 307 about a central axis of the assembly. Rotation of the lock plate 307 captures the corners of the mounting plate 406 which is integrated into the rear assembly 101.

As the rear assembly 101 and docking mount 102 come together, a series of pogo pins makes electrical contact with a matching pattern of contact pads at the connection interface. By retaining the mounting plate 406, the lock plate 307 mechanically secures the rear assembly 101 to the docking mount 102, while the pogo pins and mating contact pads at the connection interface provide electrical connectivity.

Figure 7:
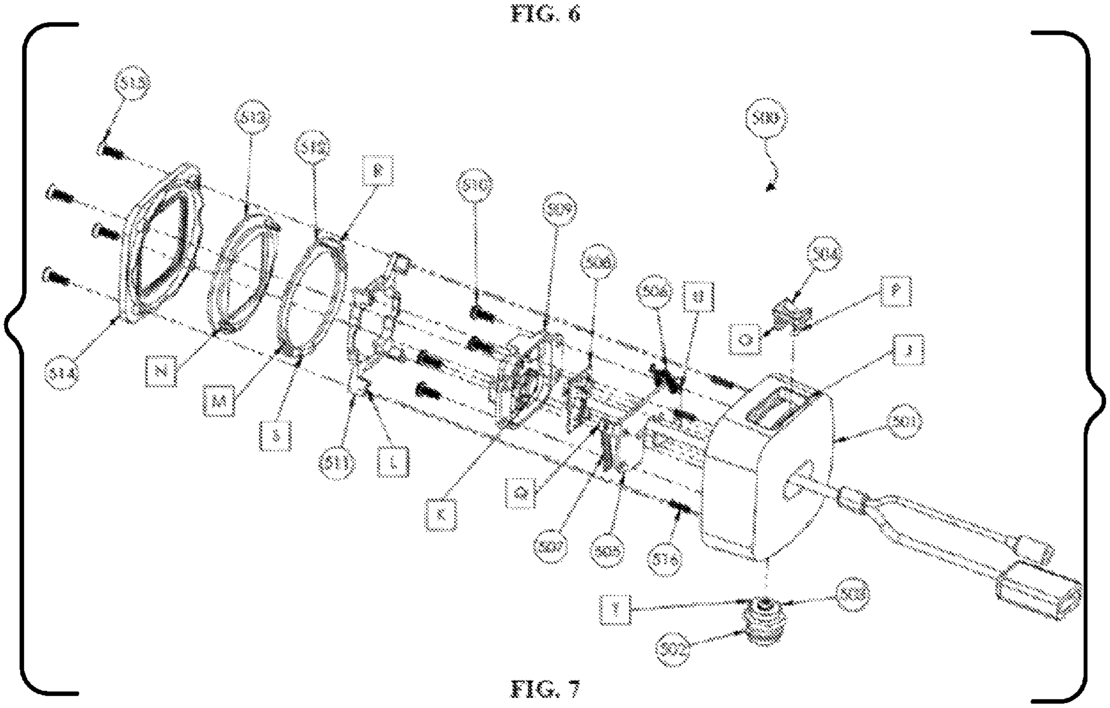
FIG. 7 illustrates an example docking mount in exploded view.

FIG. 7 illustrates an exploded view of an example docking mount 500. The mount 500 is assembled by routing cable 302 through internal dock plate 505, and dock mount housing 501. The internal dock plate 505 attaches with screws to ball halves, which are in turn enclosed as part of a pivot assembly. The circuit board 508 at the end of cable mounts into magnet housing 509 with heat stakes (or similar attachment). The magnet housing 509 is then secured into the dock mount housing 501 with four additional screws, which clamp and secure the internal dock plate 505 in the process. The lock plate is then set into place, with gear teeth meshing with the gear teeth on the lock pinion 205. Finally, the mount cover is placed over the lock plate and secured with four screws. The components in this assembly may be assembled in an order different from that described above, different fasteners may be used, and any type or shape of mounting apparatus (including, but not limited to, a ball-in-socket joint) may be used.

FIG. 7 illustrates example components of a first alternative embodiment of a dock mount 500. The mount is assembled by routing the cable attached to PCB 508 through internal dock plate 505, and dock mount housing 501. A key lock 502 is mounted into the housing using the nut provided with the key lock 502. The lockout pawl 503 is then secured to the lock mandrel with screw 206. An anti-rotation plate may also be used when mounting the lock. This initial assembly is similar to the example docking mount 300 of FIG. 3. After assembly of the key lock 502 and associated parts, the release button 504 is seated into its slot J in the dock mount housing 501. The internal dock plate 505 is then seated into the housing, with button return spring 506 held on pin U beneath it. Once seated, the internal dock plate 505 attaches with screws 304 to ball halves 303 (not shown; similar to other embodiments), which are in turn enclosed as part of a pivot assembly (also not shown). After the internal dock plate 505 is seated, the free end of button return spring 506 is placed over hook P on release button 504. Next, the circuit board 508 is mounted into magnet housing 509 with heat stakes K (or similar attachment).

Magnet housing 509 is pre-assembled with four magnets. Magnet housing 509 is then seated over the internal dock plate 505 and secured into the dock mount housing 501 with four screws 510, which pass through and secure internal dock plate 505 in the process. Next four compression springs 516 are placed in slotted sleeves in the dock mount housing 501 and pressure plate 511 seated over the magnet housing 509 with four rib areas L pressing downward onto the compression springs 516. The release plate 512 and lock plate 513 are then set into place, nesting into each other and with spring hooks N on the lock plate 513 passing through slots M in release plate 512 and release tab R seating into slot O on release button 504. Lock springs 507 are attached between spring hooks N on the lock plate 513 and opposing spring hooks Q on the internal dock plate 505. After the lock springs 507 are in place, mount cover 514 is placed over the lock plate 513 and secured with four screws 515. The components in this assembly may be assembled in an order different from that described above, different fasteners may be used, and any type or shape of mounting apparatus (including, but not limited to, a ball-in-socket joint) may be used.

Figure 8:
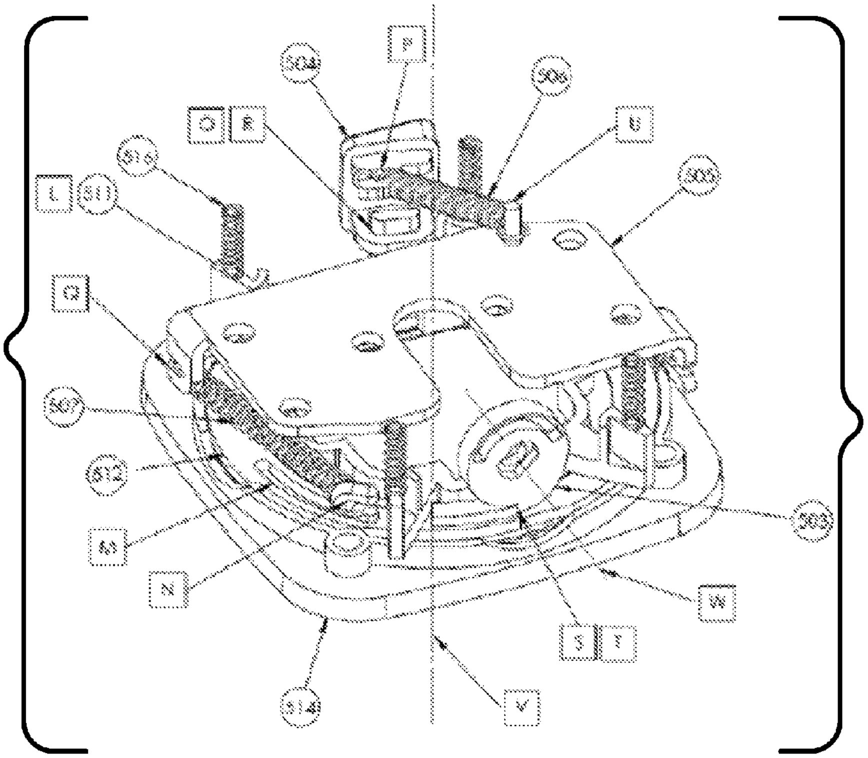
FIG. 8 illustrates an example docking mount with the dock mount housing not shown.
Figure 9:
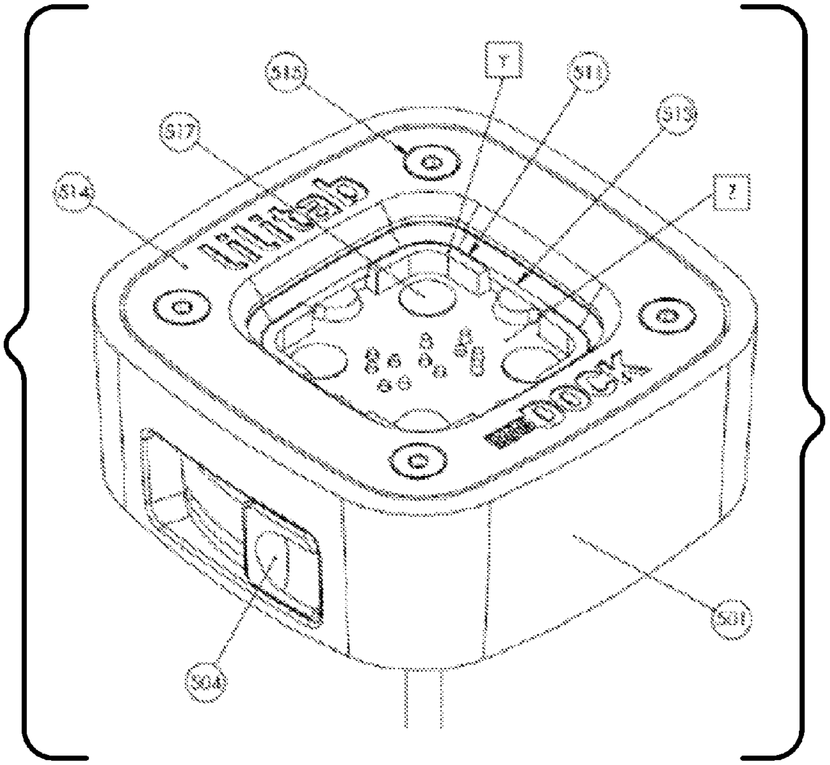
FIG. 9 illustrates an example docking mount.

FIG. 8 shows an example docking mount with the housing not shown. FIG. 9 shows an example docking mount assembly showing the pressure plate 511 and a release lever (button) 504. Referencing both FIG. 8 and FIG. 9, the lock plate 513 is disposed between mount cover 514 and release plate 512. The lock plate is spring loaded with a lock spring 507 that attaches to a spring hook N on the lock plate 513 and preload it in a clockwise direction (from the perspective of FIG. 8) around axis V. In some embodiments, there are more than one lock spring 507 and spring hook N for the lock plate 513. The pressure plate 511 has ribbed areas L, and the docking mount has compression springs 516 positioned in respective slotted sleeves in the docking mount. The ribbed areas L press onto the compression springs 516. The lock plate 513 is prevented from moving by pressure plate 511 (see also FIG. 9) which is held toward the front of the dock mount by four springs 516 acting on ribs L. The lock plate 513 is shown in FIG. 8 and FIG. 9 in the open position, ready to receive a mounting plate 406 and corresponding rear assembly 101. When the rear assembly 101 is docked, the mounting plate 406 depresses the pressure plate 511, releasing the lock plate 513 which, driven by lock springs 507, rotates in a clockwise direction (from the perspective of FIG. 8) around axis V, capturing the mounting plate 406, and by extension, the rear assembly 101. When this occurs, spring hook N, pulled by lock spring 507, rotates about axis V to the clockwise extreme (from the perspective of FIG. 8) of slot M. This occurs regardless of the position of the lockout pawl 503, as the hook N is free to move within the slot M.

The release lever, or release button 504, is coupled to the release plate 512 by release tab R (on the release plate 512) which is captured by slot O on the button. The dock plate 505 has a pin U connected to a button return spring 506. The release button 504 comprises a hook P to which the button return spring 506 connects. To release the mounting plate, the key lock 502 is in the "unlocked" position. The lockout pawl 503 is shown in FIG. 8 in the "locked" position, with hook T on lockout pawl 503 bearing against stop S of release plate 512. In this position, release button 504 and release plate 512 cannot be moved. Unlocking the key lock 502 rotates release pawl 503 counter-clockwise (from the perspective of FIG. 8) about axis W, lifting hook T away from stop S and allowing the release plate 512 to rotate. When the key lock 502 is in the unlocked position, the release button 504 may be operated by rotating it in a clockwise direction (from the perspective of FIG. 9) within its slot J. When acting to reset the lock plate 513, lifting the release button 504 rotates release plate 512 counter clockwise (from the perspective of FIG. 8) about axis V. The end of slot M pulls hook N around to the position shown in FIG. 8. When the lock plate 513 reaches the open position (as shown in FIG. 9) the rear assembly 101 (if present) is released from the docking mount 102 and the pressure plate 511, pushed by springs 516, rises upward through the lock plate 513 and holds the lock plate open, spring-loaded and ready to receive the mounting plate 406 again, or receive a different mounting plate.

FIG. 9 shows the lock plate 513 is shown in the open position. The pressure plate 511, is shown in its outward position. When the lock plate 513 is brought to the open position (by sliding release button 504 to the opposite end of its slot), the pressure plate 511 travels vertically upward, pushed by springs 516, and pushes through the lock plate 513 as shown. When the user lets go of the release button 504 (after releasing the docked object, for example, the button return spring 506 returns the release plate 512 and release button 504 to its default position. The release button 504 is shown in this position is shown in FIG. 9.

Figure 10:
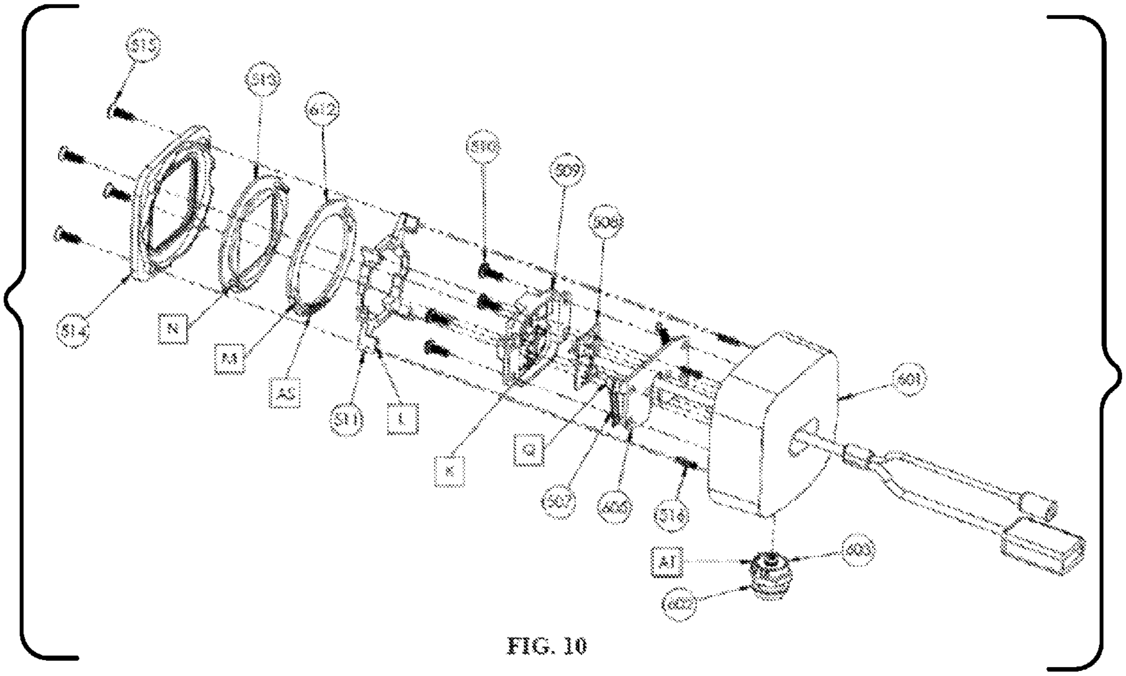
FIG. 10 illustrates an example docking mount in exploded view.

FIG. 10 illustrates an example docking mount. The docking mount is assembled by routing the cable attached to PCB 508 through internal dock plate 605, and dock mount housing 601. A key lock 602 is mounted into the housing, and then lock pinion 603 is mounted to the lock mandrel. An anti-rotation plate may also be used when mounting the lock. This initial assembly is similar to the dock mount housing assembly 200 of FIG. 3. After assembly of the key lock 602 and associated parts, the internal dock plate 605 is seated into the housing. Once seated, the internal dock plate 605 attaches with screws 304 to ball halves 303 (not shown; similar to other embodiments), which are in turn enclosed as part of a pivot assembly (also not shown). Next, the circuit board 508 is mounted into magnet housing 509 with heat stakes K (or similar attachment).

Magnet housing 509 is pre-assembled with four magnets 306. Magnet housing 509 is then seated over the internal dock plate 605 and secured into the dock mount housing 601 with four screws 510, which pass through and secure the internal dock plate 605 in the process. Next four compression springs 516 are placed in slotted sleeves in the dock mount housing 601 and pressure plate 511 seated over the magnet housing 509 with four rib areas L pressing downward onto the compression springs 516. The release plate 612 and lock plate 513 are then set into place, nesting into each other and with spring hooks N on the lock plate 513 passing through slots M in release plate. Lock springs 507 are attached between spring hooks N on the lock plate and opposing spring hooks Q on internal dock plate 605. After the lock springs 507 are in place, mount cover 514 is placed over the lock plate 513 and secured with four screws 515. The components in this assembly may be assembled in an order different from that described above, different fasteners may be used, and any type or shape of mounting apparatus (including, but not limited to, a ball-in-socket joint) may be used.

Figure 11:
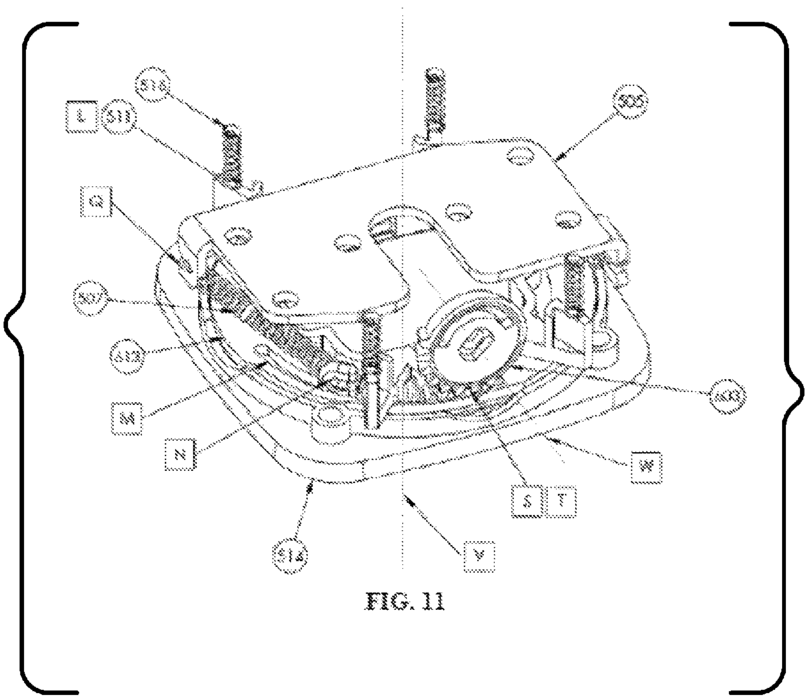
FIG. 11 illustrates an example docking mount with the dock mount housing not shown.
Figure 12:
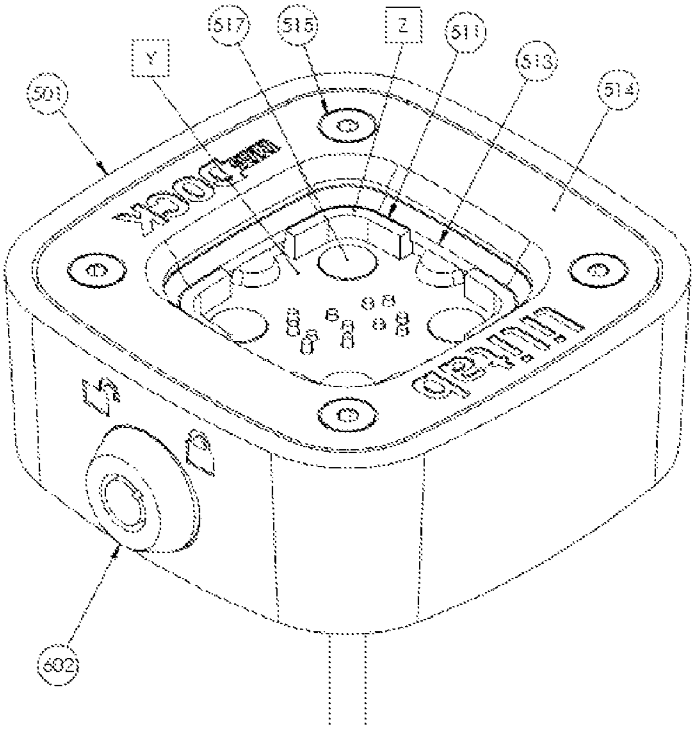
FIG. 12 illustrates an example docking mount.

FIG. 11 shows an example docking mount with the housing not shown. Referencing both FIG. 10 and FIG. 11, the lock plate 513 is disposed between mount cover 514 and release plate 612. Lock springs 507 attach to hooks N on lock plate 513 (one on each side) and preload it in a clockwise direction (from the perspective of FIG. 8) around axis V. The lock plate 513 is prevented from moving by pressure plate 511 (see also FIG. 12) which is held toward the front of the dock mount by four springs 516 acting on ribs L. The lock plate 513 is shown in FIG. 10 and FIG. 11 in the open position, ready to receive a docked object. When an object 101 is docked, the mount plate 406 depresses the pressure plate 511, releasing the lock plate 513 which, driven by lock springs 507, rotates in a clockwise direction (from the perspective of FIG. 11) around axis V, capturing the mount plate 406, and by extension, the rear assembly 101. When this occurs, hook N, pulled by lock spring 507, rotates about axis V to the clockwise extreme (from the perspective of FIG. 8) of slot M, unless the key is left in the lock 602 and in the "unlocked" position. When this is the case, the dock mount 102 is "locked open" the lock plate 513 cannot turn (because hooks N will be prevented from rotating by slot M in release plate 612, which in turn is held fixed by the bevel gear S/T on lock pinion 603. To prevent this situation from happening accidentally, a key lock 602 which only allows removal of the key in the "locked" position can be used. Such a key lock is shown in FIG. 12. To release a rear assembly 101, a key is turned counter-clockwise (from the perspective of FIG. 11 and FIG. 12) in the key lock 602.

The bevel gear teeth S on the lock pinion 603 are driven in the same direction as the key turning by the lock mandrel. They engage with the bevel gear teeth T on the release plate 612, which rotates counter clockwise (from the perspective of FIG. 11) about axis V. The end of slot M pulls hook N around to the position shown in FIG. 11. When the lock plate 513 reaches the open position (as shown in FIG. 12) the rear assembly 101 (if present) is released from the dock mount 102 and the pressure plate 511, pushed by springs 516, rises upward through the locking plate 513 and holds it open, spring-loaded and ready to receive the mounting plate 406 on the next rear assembly 101. In some embodiments, because of the special key lock 602 used, the key is to be rotated to the "locked" position before it can be removed. This acts (via bevel gear teeth S/T) to return release plate 612 to the position shown in FIG. 11. In this position, hook N is free to move within slot M if the pressure plate 511 is depressed, thus allowing the lock plate 513 to again capture the mount plate 406.

FIG. 12 shows an example docking mount showing the pressure plate 511 and key lock 602. The lock plate 513 is shown in the open position. The pressure plate 511, is shown in its outward position. When the lock plate 513 is brought to the open position (by turning a key in key lock 602 to the "open" position), the pressure plate 511 travels vertically upward, pushed by springs 516, and pushes through the lock plate 513 as shown. When the user rotates the key lock 602 back to the "locked" position (in order to get the key out), the release plate 512 is brought back to the position shown in FIG. 11. The key lock 602 is shown in the "locked" position in FIG. 12.

A number of implementations have been described. Nevertheless, it will be understood that various modifications can be made without departing from the spirit and scope of the invention.

What is claimed is:

1. A key-lockable mechanical mount comprising:

a housing;

a locking unit disposed on the housing, the locking unit comprising a lock mandrel, the locking unit configured to be rotated to either an open position or a closed position with a key;

a pinion mounted to the lock mandrel, the pinion configured to rotate in response to a rotation of the locking unit using the key; and a lock plate configured to be received in the housing, the lock plate configured either to rotate in response to the rotation of the pinion or be driven by springs, the lock plate configured to capture a mounting plate configured to attach to electronic equipment.

2. The mount of claim 1, wherein the lock plate comprises a plurality of gear teeth, and wherein the pinion comprises a bevel gear that comprises a plurality of bevel gear teeth configured to mesh with the plurality of gear teeth in response to the rotation of the pinion.

3. The mount of claim 1, wherein the lock plate is spring-loaded, the mount further comprising:

at least one lock spring;

at least one spring hook to attach the lock plate to the at least one lock spring;

a pressure plate to hold the lock plate open until depressed by a mounting plate; and a release plate to open the lock plate and reset the pressure plate.

4. The mount of claim 3, wherein the release plate is manually actuated, the mount further comprising:

a release lever that actuates the release plate; and a lockout pawl mounted to the locking unit, the lockout pawl configured to allow or prevent operation of the release lever.

5. The mount of claim 3, wherein the release plate is driven by the pinion, which is actuated by the locking unit, wherein the pinion incorporates a bevel gear and the release plate comprises a series of gear teeth which mesh with the teeth of the bevel gear on the pinion.

6. The mount of claim 1, further comprising a mounting plate disposed on a rear-facing surface of an electronic device or enclosure configured to receive electronic equipment.

7. The mount of claim 1, wherein the electronic equipment is a tablet computer.

8. The mount of claim 1, wherein the housing further comprises lead-in geometry configured to orient and guide the mounting plate into the housing.

9. The mount of claim 1, wherein the housing further comprises a locating protrusion configured to engage with a locating pocket or notch included in the mounting plate.

10. The mount of claim 1, wherein the housing further comprises a magnet configured to attract the mounting plate to the housing.

11. The mount of claim 1, wherein the housing further comprises electrical contacts to transfer electrical signals through the mounting plate to the electronic equipment.

12. The mount of claim 11, wherein the electrical contacts are configured to provide power and data connection in a primary orientation including at least one of a portrait orientation, a landscape orientation, an inverted portrait orientation or an inverted landscape orientation.

13. The mount of claim 11, wherein the electrical contacts comprise a plurality of pogo pins configured to mate with contact pads attached to the electronic equipment.

14. The mount of claim 1, wherein the housing comprises:

an internal dock plate configured to be disposed in the housing, wherein the housing and the internal dock plate include passages configured to receive a cable to transmit signals to the electronic equipment; and a magnet housing configured to receive a circuit board connected to an end of the cable.

15. The mount of claim 1, wherein the housing comprises a front surface and a back surface separated from the front surface.

16. A key-lockable mechanical mount comprising:

a housing;

a key lock disposed in the housing, the key lock comprising a lock mandrel disposed in the housing, the key lock configured to be either in an open position or a closed position;

a lockout pawl mounted to the lock mandrel;

a release button attached to the housing, wherein the lockout pawl is configured to allow or prevent operation of the release button in response to the key lock being in the open position or the closed position;

a dock plate positioned in the housing;

a magnet housing positioned over the dock plate and attached to the housing; and a pressure plate positioned over the magnetic housing, the pressure plate positioned in the housing.

17. The mount of claim 16, further comprising an anti-rotation plate mounted to the key lock.

18. The mount of claim 16, wherein the dock plate comprises a pin, the mount further comprising a button return spring positioned beneath and connected to the pin.

19. The mount of claim 18, the release button comprising a hook to which the button return spring is connected.

20. The mount of claim 16, wherein the pressure plate comprises a plurality of rib areas, and wherein the mount comprises a plurality of compression springs positioned in respective slotted sleeves in the mount, and wherein the plurality of ribbed areas press onto the plurality of compression springs.

21. The mount of claim 16, further comprising a release plate and a lock plate attached to the housing with spring hooks on the lock plate passing through slots in the release plate, the release plate comprising a release tab configured to attach to a slot on the release button, the lock plate comprising a plurality of lock springs attached between a respective plurality of spring hooks and opposing spring hooks on the dock plate.

22. A system for mounting an electronic device, the system comprising:

a support structure having a first end and a second end;

a key-lockable mount configured to be attached to the first end of the support structure;

a lock plate disposed within the key-lockable mount, the lock plate configured to rotate either in response to rotation of a lock pinion or be driven by springs and be reset in response to a manual lever or in response to the rotation of the lock pinion; and a mount plate that is integral to, bonded to, or incorporated in a rear housing configured to receive an electronic device, which is configured to be captured by the lock plate.

23. The system of claim 22, wherein the mount, the mount plate, and the rear housing are configured to receive a cable configured to be connected to the electronic device to transmit power signals or data signals to the electronic device.

24. The system of claim 23, further comprising an electrical interface disposed between the mount and the rear housing, the electrical interface configured to transmit the power signals or the data signals received through the cable to the electronic device.

25. The system of claim 22, further comprising a key configured to rotate the lock pinion, which in turn rotates the lock plate to securedly affix the rear housing to or release the rear housing from the mount.

26. The system of claim 22, further comprising a pressure plate which, when depressed releases a spring-driven lock plate, which captures the rear housing to the mount, and a release latch configured to rotate the pressure plate to open the lock plate, release the rear housing from the mount, and reset the pressure plate.

27. The system of claim 22, further comprising a pressure plate which, when depressed releases a spring-driven lock plate, which captures the rear housing to the mount, and a key configured to rotate the lock pinion, which in turn rotates the pressure plate to open the lock plate, release the rear housing from the mount, and reset the pressure plate.

28. The system of claim 22, further comprising a locking unit installed in the mount, the locking unit comprising a lock pinion configured to be rotated, the lock pinion configured to drive a bevel gear on a second axis in response to a rotation of the lock pinion.

* * * * *